US008390628B2

(12) United States Patent
Harding et al.

(10) Patent No.: US 8,390,628 B2
(45) Date of Patent: Mar. 5, 2013

(54) FACIAL ANIMATION USING MOTION CAPTURE DATA

(75) Inventors: Richard S. Harding, San Marcos, CA (US); Christopher A. Mayberry, San Marcos, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 551 days.

(21) Appl. No.: 11/853,645

(22) Filed: Sep. 11, 2007

(65) Prior Publication Data
US 2009/0066700 A1    Mar. 12, 2009

(51) Int. Cl.
*G06T 13/00*    (2011.01)
(52) U.S. Cl. .................................. 345/474; 345/475
(58) Field of Classification Search .................. None
See application file for complete search history.

(56) References Cited

U.S. PATENT DOCUMENTS

| | | | | |
|---|---|---|---|---|
| 6,163,322 | A * | 12/2000 | LaChapelle | 345/473 |
| 2004/0179013 | A1 | 9/2004 | Menache | |
| 2005/0083332 | A1 | 4/2005 | Hung et al. | |
| 2007/0035541 | A1 * | 2/2007 | Isner et al. | 345/420 |

OTHER PUBLICATIONS

Havaldar, Course Notes: Performance Driven facial Animation; SIGGRAPH 2006; Jul. 30-Aug. 3, 2006.*
Curio et al.; Semantic 3D Motion Retargetting for Facial Animation; APGV 2006; Jul. 28-29, 2006.*
E. Chaung, C. Bergler; Performance Driven Facial Animation using Blendshape Interpolation; Stanford University Computer Science Technical Report; CS-TR-2002-02, Apr. 2002.*
Kouadio et al., "Real-Time Facial Animation based upon a Bank of 3D Facial Expressions"; Compuer Animation 1998; Jun. 1998.*
Deng, Z. et al., "Animating Blendshape Faces by Cross-Mapping Motion Capture Data," *Association for Computing Machinery, Inc.*, 2006, pp. 43-48, 220.
European Search Report mailed on Jul. 7, 2010, for European Application No. 08252990.0 filed on Sep. 10, 2008, 3 pages.
1 Kahler, et al., "Geometry-based Muscle Modeling for Facial Animation," Proceeding Graphics Interface, 2001, vol. CONF. 27, pp. 37-46.

* cited by examiner

*Primary Examiner* — Kee M Tung
*Assistant Examiner* — Carlos Perromat
(74) *Attorney, Agent, or Firm* — Kilpatrick Townsend & Stockton LLP (57) ABSTRACT

Methods and apparatus for facial animation using motion capture data are described herein. A mathematic solution based on minimizing a metric reduces the number of motion capture markers needed to accurately translate motion capture data to facial animation. A set of motion capture markers and their placement on an actor are defined and a set of virtual shapes having virtual markers are defined. The movement of the virtual markers are modeled based on an anatomical model. An initial facial capture is correlated to a corresponding virtual reference shape. For each subsequent facial capture, a delta vector is computed and a matrix solution determined based on the delta marker, initial positions, and set of virtual shapes. The solution can minimize a metric such as mean squared distance. The solution can be manually modified or edited using a user interface or console.

24 Claims, 7 Drawing Sheets

FACIAL ANIMATION USING MOTION CAPTURE DATA

BACKGROUND

Motion capture is a method of capturing the movement of physical objects. A popular application of motion capture is for capture of movement of physical objects and translation of the movement to an illustration of movement of an animated object.

The process of capturing and translating movement of a physical actor to a corresponding actor in a virtual or animated space can reduce the costs associated with animation. Additionally, translating captured physical movement to an animated space can impart realism to the movements of the animated actor that may not by fully realized when a manual animation process is utilized to create the movements in the virtual environment.

In a typical motion capture system, several motion capture markers are placed on a physical actor. The motion capture markers can be placed, for example, near the joints of the skeletal frame of the physical actor. At least one motion picture camera, and typically several motion picture cameras, is used to capture the movement of the actor and corresponding motion capture markers to a series of picture frames. The position of the motion capture markers can be translated to a skeletal or wire frame having corresponding modeled markers.

The placement of numerous motion capture markers on a physical actor typically does not present a problem if the space of the physical actor is large relative to the number and placement of motion capture markers. The placement of motion capture markers on a physical actor becomes more problematic as the area for markers decreases.

Using the placement of many motion capture markers to capture physical movement can perform well for relatively large spatial displacement of the motion capture markers relative to the marker size, or where errors in motion capture do not substantially affect the resultant animation. Conventional motion capture can work satisfactorily for capturing gross physical movements, such as skeletal movements.

However, in applications such as facial animation, the physical area over which the motion capture markers are to be placed is small. The complexity of facial expression magnifies the number of motion capture markers needed for a conventional motion capture implementation, but increasing the number of motion capture markers positioned on a face of a physical actor may impede the very facial expression that is sought to be captured.

Furthermore, small variations in motion capture markers may equate to large differences in the expression conveyed by the actor. Noise and errors in the motion capture process are effectively amplified in the virtual environment due to the small physical area of the physical actor having the markers and the small changes in motion capture markers corresponding to large changes in facial expression.

Facial animation based on motion capture is desirable to reduce the costs associated with facial animation. It is desirable to reduce the number of motion capture markers placed on the physical actor while simultaneously maintaining the complexity of facial expressions that can be animated from motion capture.

BRIEF SUMMARY

Methods and apparatus for facial animation using motion capture data are described herein. A mathematic solution based on minimizing a metric reduces the number of motion capture markers needed to accurately translate motion capture data to facial animation. A set of motion capture markers and their placement on an actor are defined and a set of virtual shapes having virtual markers are defined. The movement of the virtual markers are modeled based on an anatomical model. An initial facial capture is correlated to a corresponding virtual reference shape. For each subsequent facial capture, a delta vector is computed and a matrix solution determined based on the delta marker, initial positions, and set of virtual shapes. The solution can minimize a metric such as mean squared distance. The solution can be manually modified or edited using a user interface or console.

Aspects of the invention include a method of facial animation from motion capture data. The method includes acquiring motion capture data based on a plurality of motion capture markers, determining an offset of each of the plurality of motion capture markers to a corresponding virtual marker from a plurality of virtual markers, determining a solution of weights for each of a plurality of predetermined facial states in an animation library based on the offset, and combining the plurality of predetermined facial states according to the solution of weights to generate a facial animation.

Aspects of the invention include a facial animation apparatus that includes an animation library of a plurality of facial states and a virtual reference image having virtual markers mapped to motion capture markers from a reference image, a weight solver configured to access motion capture data and determine a solution of weights for each of the facial states in the animation library to optimize a performance metric, and shape deformer configured to combine the plurality of facial states according to the solution of weights to generate a facial animation for the motion capture data.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Methods and apparatus for facial animation using motion capture data are described herein. Facial animation is based on a mathematic solution optimizes a quality metric determined by blending a set of predetermined animation controls to fit motion capture data. Each predetermined animation control operates a particular defined facial movement or state in a virtual actor. The animation control encodes the muscular deformations and skin movements associated with the facial movement or facial state.

The methods and apparatus for facial animation based on a mathematic solution fitting motion capture data to predetermined facial states provides several improvements over existing motion capture facial animation techniques. The mathematic solution that optimizes a predetermined quality metric is less sensitive to noise in motion capture data. The set of predetermined facial states defines a restricted space of valid facial movements. Noise and errors in the motion capture data is filtered out during the solution process.

Each of the predetermined facial states encodes the muscular deformations and skin movements associated with the facial movement or facial state. This enables fewer motion capture markers to be placed on the physical actor, while maintaining the ability to capture and animate subtle changes in facial expression.

The predetermined animation controls that form the dimensions of the mathematic solution can be provided in a user interface that enables manual editing. The manual editing process thus can utilize the same set of controls whose settings are automatically determined during the calculation of the animation solution. Sharing controls between the manual and automated animation process allows consistency in the animation process and simplifies configuration of the manual editing process.

Figure 1:
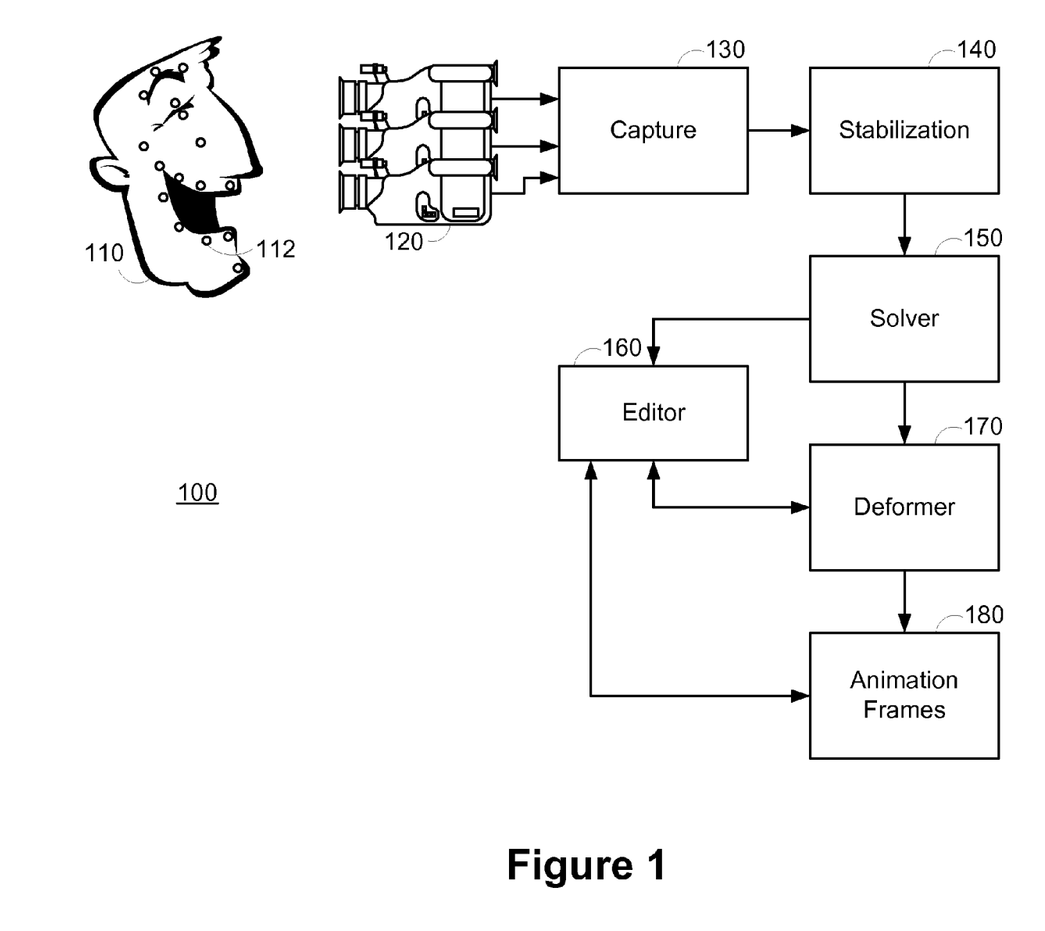
FIG. 1 is a simplified functional block diagram of an embodiment of a facial motion capture system.

FIG. 1 is a simplified functional block diagram of an embodiment of a facial animation system 100 based on motion capture data. The system 100 operates to generate motion capture data from a physical actor 110 having multiple motion capture markers 112 positioned on the face. Each of the motion capture markers 112 can be glued onto a facial position. Each of the motion capture markers 112 can be, for example, a passive marker, active marker, or some combination of passive and active marker. A passive marker can be, for example, a reflective optical marker that can be optimized for a predetermined wavelength or band of wavelengths. An active marker can be, for example, an active optical marker and can be a light source such as an LED.

At least one camera 120, and typically several cameras 120, is used to photograph or otherwise image the physical actor 110 and corresponding positions of the motion capture markers 112. It is typically advantageous to use multiple cameras in order to provide the ability to determine the locations of the motion capture markers 112 in three dimensions.

The outputs from the cameras 120 can be coupled to a data capture module 130 that operates to extract the motion capture data from the frames of camera 120 images. The data capture module 130 can operate to identify the locations of the various motion capture markers 112 within image frames from each camera 120 and can ignore, discard, or otherwise substantially eliminate the data and information that is not based on the movement of the motion capture markers 112. For example, the data capture module 130 can be configured to generate motion capture data that is merely an array of points corresponding to the motion capture markers 112. The array of points can be configured, for example, as a matrix of coordinates for the multiple motion capture markers 112. The motion capture data can be largely devoid of other visual information, such as outlines of the physical actor 110 or shading, texture, and other parameters.

The motion capture data output from the data capture module 130 is coupled to a stabilization module 140. The stabilization module 140 can be configured to substantially remove or otherwise compensate for movements of the physical actor's head. The stabilization module 140 outputs motion capture data relevant to facial animation.

The stabilization module 140 can process the motion capture data from multiple cameras 120 to determine tilt or rotation of the physical actor's 110 head. The head motion data produced by the stabilization module 140 can be used, for example, to drive head and body animation modules (not shown).

The motion capture data from the stabilization module 140 can be coupled to a solver module 150. The solver module 150 determines, for each frame of motion capture data, weights for each of a plurality of predetermined facial animation states that optimized a performance metric.

Each predetermined facial animation state can be developed as a mesh having multiple virtual motion capture markers. Each of the predetermined facial animation states is constructed in the virtual space and can be a 3-D representation of a facial expression by the physical actor. Each facial animation state does not need to be mapped to a corresponding physical facial state captured from the physical actor 110.

The changes in the positions of the virtual markers between the multiple predetermined facial states can follow an anatomical model. For example, changes in facial states can follow a Facial Action Coding System (FACS) model, or some other model for anatomical model. The facial state can be configured to extend across a predetermined range. A numerical range that is used to characterize the facial state can be normalized and bounded. However, in some embodiments, the range of over which a particular facial state is bounded need not be normalized with respect to other facial states. Similarly, a facial state need not be bounded, but typically is bounded to reflect constraints on the physical actor 110.

The solver 150 can be configured to determine a solution that optimizes a predetermined performance metric. The predetermined performance metric can be, for example, a distance, minimal distance, least square distance, bounded variable least squares, and the like, or some combination thereof.

The solver 150 couples the solution for the weights of the various facial states contributing to the captured state to a shape deformer 170. The shape deformer 170 produces a facial animation frame that is a blend of each of the facial states contributing to the solution. In an embodiment, the shape deformer 170 is configured to deform the facial state based on the weight of the facial state determined by the solver 150. The shape deformer 170 can perform, for example, linear vertex morphing of the various facial states contributing to the animation solution.

The solver 150 can also communicate or otherwise make the solution available to a manual editor 160. The manual editor 160 can be configured to permit an animator to modify the weights for each of the facial states, and can permit the animator to add or delete one or more facial states contributing to the facial animation solution. The manual editor 160 can be configured to permit edits on a single frame basis or on multiple frame basis. For example, the manual editor 160 may permit application of global changes that affect all facial animation solutions for a particular motion capture file or group of frames. The manual editor 160 can be configured to operate in conjunction with the shape deformer 170, for example, to update the facial animation based on the edits in order to provide visual feedback to the animator.

As an example, the manual editor 160 may permit the animator to edit the weight of a particular facial state contributing to the facial animation. In another example, the manual editor 160 may permit the animator to adjust or otherwise reconfigure one or more of the bounds corresponding to the facial state ranges. For example, where the facial states are normally bounded to lie within a normalized range of 0-1, the manual editor 160 may permit the range of a particular state to range over 0-1.25, 0-0.8, or some other range.

In one embodiment, the manual editor 160 can provide a user interface that includes a console having a control, such as a knob or slider, for each facial state. The animator can manipulate the control to modify the weight attached to the corresponding facial state.

The final facial animation generated by the shape deformer 170, regardless of whether manual editing contributed to the animation, is coupled from the shape deformer 170 to an animation module 170. The animation module 170 permits further animation of the facial animation state, such as coloring, texturing, shading, or other techniques or operations that are not specifically related to facial animation based on motion capture data. For example, the animation module 180 can include a memory to which the facial animation frames are stored for further access and processing.

Figure 2:
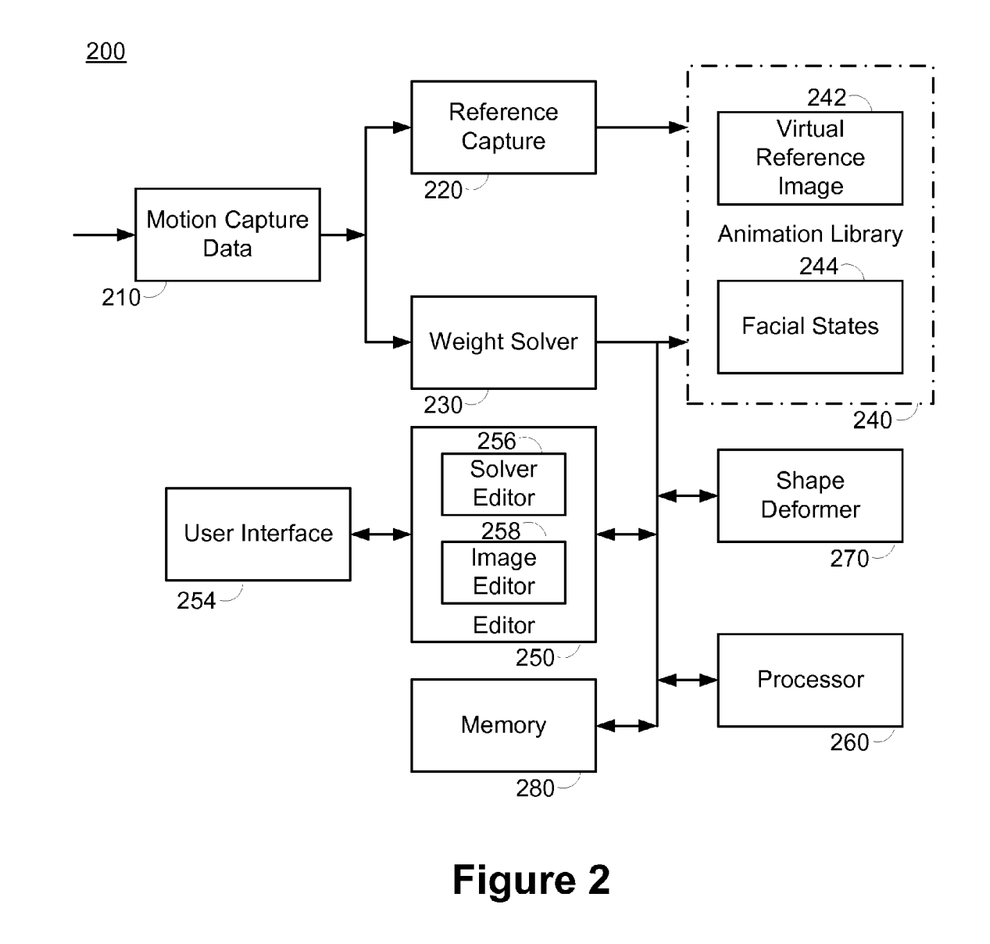
FIG. 2 is a simplified functional block diagram of an embodiment of a facial animation apparatus.

FIG. 2 is a simplified functional block diagram of an embodiment of a facial animation apparatus 200. The facial animation apparatus 200 can implement, for example, portions of various modules illustrated in the facial animation system 100 of FIG. 1.

The facial animation apparatus 200 includes a storage device 210 configured to store motion capture data. The motion capture data can be stored, for example, as a series of frames of motion capture data. The motion capture data can be facial motion capture data that has been stabilized to remove head movements, such as tilt, rotation, and shift. The storage device 210 can be virtually any type of electronic storage device and can be, for example, solid state memory, including RAM, magnetic memory, including hard disk memory and magnetic tape, optical memory, including optical disks, and the like or some combination thereof.

The storage device 210 can be coupled to a reference capture module 220 and a weight solver 230. The reference capture module 220 can be configured to establish a relationship between a predetermined expression from a physical actor captured in motion capture data to a corresponding predetermined facial expression of a virtual actor. The reference capture module 220 can be coupled to the weight solver 230 as well as to an animation library 240.

The reference capture module 220 is typically utilized during a calibration phase that occurs prior to filming of the motion sequence that forms the basis for the motion capture data. In particular, the reference capture module 220 can be used to establish a relationship or mapping between a captured expression of a physical actor and a corresponding predetermined expression stored as a virtual reference 242 in the animation library 240.

An initial image is captured of the physical actor in a predetermined pose or predetermined expression. The initial image is typically a three dimensional image capture of the physical actor. The predetermined expression may be, for example, a rest pose in which the physical actor is substantially expressionless. Of course, the predetermined expression is not limited to a rest pose and may be nearly any pose or expression.

The virtual reference 242 within the animation library 240 is configured to store a predetermined facial expression that can correspond to the predetermined expression from the physical actor. The virtual reference 242 can include, for example, the information and data derived from an animated, virtual head, having virtual markers placed at points corresponding to the placement points of motion capture markers on the head of the physical actor.

In one embodiment, the virtual reference 242 can be generated using Non-Uniform Rational B-Splines (NURBS) to produce a mathematical representations of the 3-D geometry corresponding to the physical head. The appearance of the virtual NURBS head model need not be identical to the appearance of the physical model. Indeed, in some embodiments, the virtual actor need not be based on a real actor, but may instead be a model of a stylized animation character.

In another embodiment, the virtual actor may be generated using a 3-D scan of the physical actor. The 3-D scan may produce a surface of a mesh that defines a virtual actor. Use of the 3-D scan may be advantageous where it is desirable for the virtual actor to substantially duplicate the look of the physical actor.

In another embodiment, the virtual reference 242 can be generated as a three dimensional shape or surface defined by multiple polygonal meshes. Each polygonal mesh defines a portion of the surface of the virtual reference 242.

The virtual markers can be positioned on the surface of the virtual head. The position of each of the virtual markers can be configured to remain on the same point on the surface of the mesh defined by the NURBS curves even when the mesh is deformed.

The reference capture module 220 can be configured to map the positions of the motion capture markers from the three dimensional captured predetermined expression from the physical actor to the position of the virtual markers on the virtual reference 242. In one embodiment, the reference capture module 220 automatically registers and aligns the captured predetermined expression to the virtual reference 242 prior to performing the mapping. For example, the reference capture module can be configured to modify the registration and alignment of the captured motion capture data relative to the virtual reference 242 based on an alignment or registration metric. The alignment or registration metric can be, for example, a minimal distance, least square, and the like, or some combination thereof that relates the position of the motion capture markers in the captured image to the position of the virtual markers in the virtual reference 242.

In another embodiment, registration and alignment of the captured predetermined expression to the virtual reference 242 can be semi-automated or manual. For example, a user may utilize a user interface 254, to manipulate a display of the captured predetermined expression that is overlaid on a display of the virtual reference 242 in order to substantially align the motion capture markers of the physical actor to the virtual markers on the virtual reference 242. The user may, for example, utilize the user interface 254 to translate, rotate, scale, or otherwise register and align the motion capture markers to the virtual markers. The user may then initiate the reference capture module 220 to perform the mapping operation. The mapping operation results in an approximate correlation of a surface of the physical actor, as defined by the placement of the motion capture markers, to a surface of the virtual actor.

Advantageously, the facial animation apparatus 200 may utilize as few as a single predetermined expression, although in other embodiments, more than one predetermined expression from a physical actor can be mapped to a corresponding virtual reference 242. The ability of the facial animation apparatus 200 to utilize a single mapping of a predetermined expression permits the facial animation process to be performed almost entirely in the virtual domain. Additionally, minimizing the number of predetermined expressions from a physical actor reduces the time needed to perform and capture a reference expression for each predetermined expression.

The motion capture data 210 for captured images other than the predetermined expressions are coupled to the weight solver 230. Again, as before, the captured images are typically three dimensional images or convey three dimensional information. The weight solver 230 is coupled to the animation library 240 and uses a virtual expression library 244 as well as the virtual reference 242 to generate a facial animation solution.

Each facial expression in the virtual expression library 244 can be based on the same virtual actor used to produce the virtual reference 242. Each facial state can be a different facial expression by the three dimensional virtual actor. For example, an animator may manipulate the mesh defined by the NURBS curves to generate each of the facial states in the virtual expression library 244. The number and types of facial states may be determined based on a range of facial expressions desired of the virtual actor. The animated facial expression of the virtual actor may exhibit missing movements if the virtual expression library 244 includes an insufficient number and type of facial states. Typically, each facial state in the virtual expression library 244 is generated to represent realistic facial movements. Limiting the facial states in the virtual expression library 244 to realistic facial expressions may be desirable in cases where it is desirable for the facial animation to realistically track the human performance in the motion capture data. However, in some embodiments, the facial states in the virtual expression library 244 may represent exaggerated, distorted, or otherwise unrealistic facial movements.

An artist can sculpt each facial state in the virtual expression library 244 using the virtual reference 242 as a starting point. The detailed muscular and skin deformations appearing in each of the virtual facial states occurs as a product of the shapes, e.g. NURBS. The virtual markers positioned on the mesh maintain their position on the mesh as the mesh is deformed.

The weight solver 230 can be configured to determine the relative weights applied to each of the facial states in the animation library 240 that combine to reproduce the facial expression represented by the motion capture data. In one embodiment, the weight solver 230 can be configured to determine control values, such as relative weights or blend shape weights, for each frame of motion capture data 210. The weight solver 230 can be configured to produce a set of weights or control values based on a performance metric such that the virtual markers substantially match or otherwise align with the motion capture markers. The weight solver 230 can re-determine or otherwise re-compute the weights for each frame of motion capture data.

In the motion capture data corresponding to the movements of the physical actor, muscle activations in the face deform the skin causing the motion capture markers to translate in space. The weight solver 230 determines weights to deform the skin or surface of the virtual actor to cause the virtual markers to translate in space by a corresponding amount. For each frame of motion capture data, the weight solver 230 can be configured to find the set of weight values, e.g. blend shape weight values, that align the virtual markers with the motion capture data.

Based on the premise that the points on the surface of the virtual actor move linearly. The solution determined by the weight solver 230 can be implemented as a straightforward least-squares type, linear optimization problem Given m controls (e.g. blend Shape weights) the new position of a point is calculated as:

$$\bar{p}_i = p_i + \sum_{j=1}^{m} (d_j t_j) \text{ where } d_j = p_{ij} - p_i \text{ and}$$

$p_i$=position of the ith point when all controls are at their maximum, and
$p_{ij}$=position of the ith point when control $t_j$ is at its maximum.

From the equation presented above, the following vectors and matrices can be defined:
$t = (t_1\ t_2\ \ldots\ t_m)^T$, m×1 vector of control values.
$z_i = (p_{ix}\ p_{iy}\ p_{iz})^T$, rest position of the ith point.
$y_i = (p^T_{ix}\ p^T_{iy}\ p^T_{iz})^T$, target position of the ith point.
$X_i = (d_1\ d_2\ \ldots\ d_m)$, 3×m array of delta values.

The definition of the vectors and matrix leads to the following equation for the position:

$$\bar{p}_i = z_i + X_i t$$

The weight solver 230 can be configured to determine values for the m controls that optimize a performance metric. The performance metric can be configured to be almost any metric that is indicative of suitability of an animation. However, because the position of the motion capture markers can be expressed as distances to relative to initial rest positions of the virtual markers in the various facial states, it may be convenient to utilize a performance metric that is distance based. For example, the performance metric can be a squared distance, and the optimal performance metric can be a minimal squared distance. The weight solver 230 can be configured to determine the values of the m controls that result in a minimal squared distance determined by the following equation:

$$d_i^2 = [y_i - (z_i + X_i t)]^2$$

The gradient with respect to the weights, can be determined by taking the derivative of the above equation with respect to t. The gradient can thus be determined by the following equation:

$$2X_i^T X_i t - 2(y_i - z_i)^2 X_i$$

The optimal value occurs when the gradient is substantially zero. The weight solver 230 can be configured to determine the solution for n points corresponding to each of the motion capture markers by solving a block matrix generated from individual gradient equations. Thus, the weight solver 230 can be configured to determine the generalized solution for the following matrix:

$$\begin{pmatrix} X_1^T X_1 \\ X_2^T X_2 \\ \vdots \\ X_n^T X_n \end{pmatrix} t - \begin{pmatrix} X_1^T (y_1 - z_1) \\ X_2^T (y_2 - z_2) \\ \vdots \\ X_n^T (y_n - z_n) \end{pmatrix} = 0$$

Each of the m controls can be bounded over a predetermined range, for example [0.1]. Thus, the weight solver 230 can be configured to determine a solution that satisfies the constraints of the bounds. The weight solver 230 can be configured to determine a bounded least squares solution, where each weight can be constrained to be within a predetermined bounded range.

The weight solver 230 can be configured to couple the solution of weights to a storage device, such as a memory 280. The weight solver 230 can store the weight solution for each frame of motion capture data in memory 280 for access by one or more additional modules.

A shape deformer 270 can be coupled to the animation library 240 and the memory 280. The shape deformer 270 can access the weights for a particular frame and generate the corresponding facial animation by applying the weights to the facial states from the animation library 240. The shape deformer 270 can be configured, for example, to perform linear vertex morphing of the shapes from the animation library 240. In other embodiments, the shape deformer 270 can be configured to blend the various facial states from the animation library using some other technique. The shape deformer 270 can store the deformed or otherwise blended shape in memory 280, or can be configured to generate the blended or deformed shapes during a presentation or output process.

The facial animation apparatus 200 can be implemented, for example, as distinct hardware modules, configured as one or more processor readable instructions implemented as software stored in storage devices and executed on one or more processors 260, or configured as some combination thereof. In one embodiment, the facial animation apparatus 200 can be implemented using software running on a computer workstation. The memory 280 can be configured to store one or more instructions that are executed by the processor 260 to perform one or more functions of one or more of the modules.

A user can access and manually edit the weight solution for one or more motion capture frames using a user interface 254 coupled to an editor 250. For example, an animator can display one or more of the facial animation frames that is derived from blending the facial states according to the weights determined by the weight solver 230. The animator can manually edit the facial animation using a user interface 254 coupled to an image editor 258 that is part of the editor 250.

The user interface 254 and image editor 258 can be configured to permit manual edits of the facial animation using substantially the same processes used to achieve the facial animation. For example, the user interface 254 may display the facial animation and the weights determined by the weight solver 230. The user interface 254 may permit the animator to adjust a weight corresponding to one or more of the facial states from the animation library 240.

The user interface 254 can be implemented in hardware or as a combination of software and hardware. For example, the user interface 254 can be a graphical user interface (GUI) that is configured with hardware to provide outputs and receive user inputs.

In one embodiment, the user interface 254 may provide a control that adjusts the weight of a corresponding facial state. The user interface 254 can provide a corresponding control for each facial state in the animation library 240, or can provide a control that can be selectively associated with one or more facial states. As an example, the user interface 254 can be a GUI that illustrates a slide control for facial states in the animation library 240. The user interface 254 can include a control for each of the facial states or may provide controls for a subset of facial states. For example, the user interface 254 may omit a control corresponding to the virtual reference 242, as an absence of weights applied to all other facial states may result in the virtual reference 242. The animator can move a slide control to vary a weight associated with a corresponding facial state. The animator can thus manually edit the weights and resulting facial animation.

The editor 250 can be configured to receive the modified weights from the user interface 254 and control the shape deformer 270 to update the facial animation. The editor 250 can then format the updated facial animation for display by the user interface 254. The editor 250 can store, for example, the edited weights and the corresponding facial animation. The editor 250 can be configured to modify the weights and facial animation for the animation frame stored in memory 280 if the animator accepts or otherwise stores the edits.

The editor 250 can also include a solver editor 256 that permits a user to modify, via the user interface 254, one more parameters or constraints related to the weight solver 230. For example, the user can use the solver editor 256 to modify or otherwise configure the number and identity of the facial states from the animation library 240 that are available to the weight solver 230. Additionally, the user may use the solver editor 256 to modify solver constraints, such as mutual exclusivity of facial states. The user can also use the solver editor 256 to modify the bounded range for the weights of one or more of the facial states 244 in the animation library 240.

The weight solver 230 can be configured to refresh or otherwise redetermine the weight solutions for one or more of the frames if solver parameters or constraints are modified using the solver editor 256 after an initial weight solution has been determined. For example, the user may wish to enhance a specific facial expression after seeing the results of initial animation and may use the solver editor 256 to modify the range associated with the facial expression to permit an extended range. The weight solver 230 can then be configured to refresh or otherwise re-determine some or all of the frames based on the new parameters.

Figure 3:
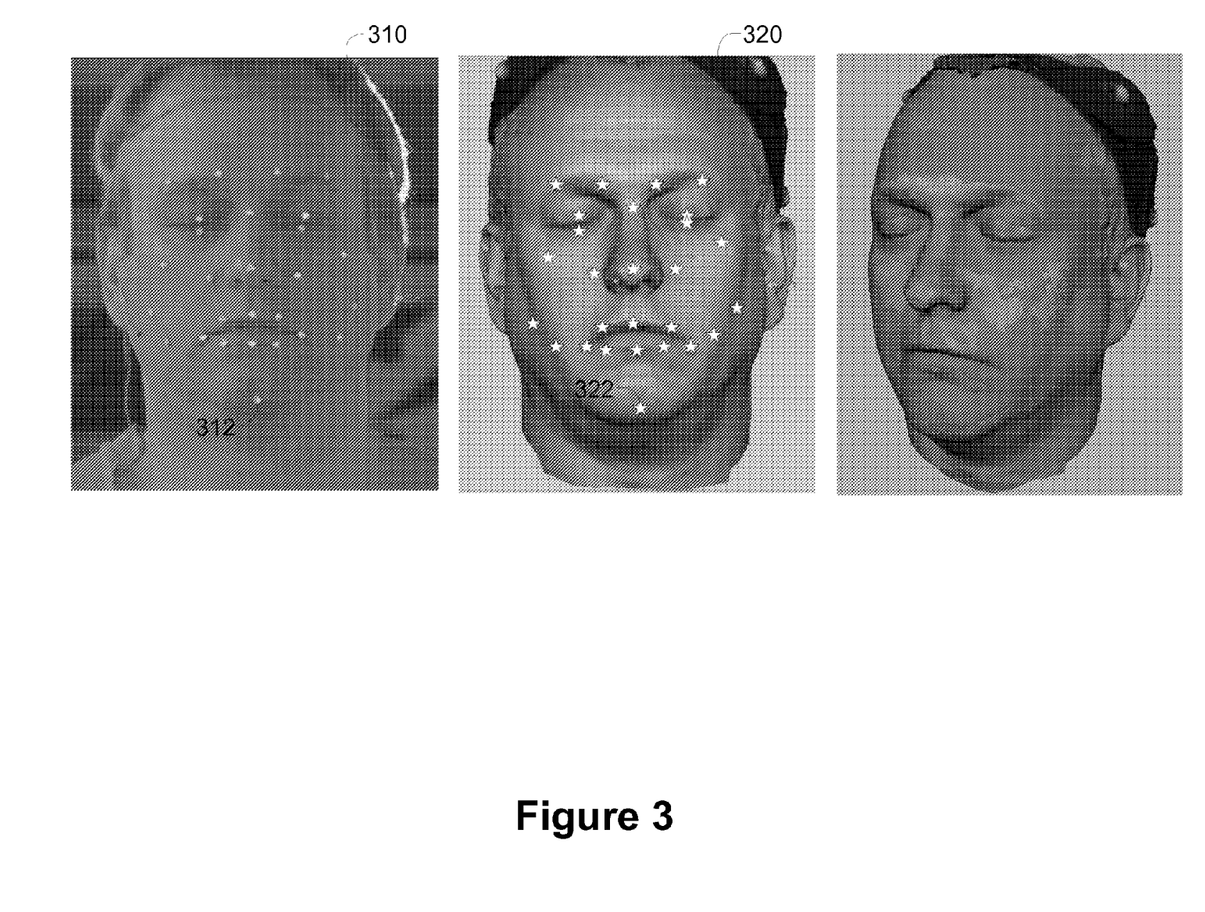
FIG. 3 is a simplified example illustrating registration and alignment.

FIG. 3 is a simplified example illustrating registration and alignment. The illustrations in FIG. 3 include the image of the physical actor and virtual actor for the sake of convenience. The captured image and the virtual actor image may include three dimensional information that is not readily visible from the illustrations in FIG. 3. The process of registering and aligning the motion capture markers from the image of the physical actor to the virtual markers of a virtual actor may be accomplished using just the positions of the markers, using a wire mesh model of the virtual actor, using images of the physical actor, using the skinned version of the virtual actor, and the like, or some combination thereof.

The initial registration and alignment of the motion capture markers from the image of the physical actor to the virtual markers of a virtual actor may be performed during an initial calibration and phase of facial animation. The registration and alignment process may not need to be repeated during facial animation based on motion capture data. Additionally, the registration, alignment, and mapping of the physical actor to the virtual actor may be accomplished using as few as a single predetermined facial expression.

The motion capture apparatus captures a reference image 310 of a physical actor having multiple motion capture markers positioned on the face. The reference image 310 is typically a three dimensional image of the physical actor. In the example of FIG. 3, the reference image 310 is a predetermined facial expression of a rest pose with eyes closed. It may be convenient to establish a predetermined facial expression that corresponds to substantially no facial expression, but the actual facial expression that is used for the reference image 310 is not a limitation on the facial animation apparatus and process.

The facial animation process can also include a virtual reference image 320 that is a facial state that substantially corresponds to the predetermined facial expression represented by the reference image 310. The virtual reference image 320 can also be a three dimensional image from a three dimensional model of a virtual actor. The virtual reference image 320 includes multiple virtual markers positioned on the face of the virtual actor. Typically, the number of the virtual markers 322 is the same as the number of motion capture markers 312 on the physical actor, and the placement of the virtual markers 322 substantially duplicates the placement of the motion capture markers 312 on the physical actor. However, having an identity of number of markers and position of markers is not a limitation, and there may be instances where it is not possible or desirable to satisfy both or even either constraint. The virtual actor can be generated as a mesh of NURBS curves, as a 3-D scan of the physical actor, or by some other manner.

The facial animation apparatus and methods are not limited to facial animation of a virtual actor that substantially duplicates the appearance of a physical actor. Instead, the virtual actor may be a stylized actor that has little resemblance to the physical actor. Examples of stylized virtual actors include virtual actors that resemble animals, cartoon characters, mechanical apparatus, artistic sculptures, or some other stylized animation character.

The captured reference image 310 of the physical actor can be registered and aligned with the virtual reference image 320 either manually or automatically. In a manual process, a user can overlay the reference image 310 on the virtual reference image 320 via controls on a user interface. The user may then adjust or otherwise control parameters relating to the reference image 310 or virtual reference image 320 to register and align the motion capture markers 312 with the virtual markers 322.

In one embodiment, the user can adjust a scale, rotation, tilt, and translation of the reference image 310 to align it with the virtual reference image 320. The level of registration and alignment may be reported to the user as a metric or may be subjectively optimized by the user. A registration and alignment metric can be, for example, a least distance or a least square distance, or some other measure. An automated registration and alignment process can modify each of a predetermined number of parameters to optimize the registration and alignment metric.

Once the two images are registered and aligned, the position of the motion capture markers 312 is mapped to the position of the virtual markers 322. In embodiments where only a single mapping occurs, all facial animation is based on the mapping of the reference image 310 to the virtual reference image 320.

Once mapping is complete, the facial animation that is generated from the motion capture data can be computed mathematically entirely in the virtual domain. The weights from the weight solver operate to deform the various facial states from the animation library that contribute to the animated facial expression. The detailed skin and muscular deformations that occur in the virtual actor and that display as facial animation occur as a result of deformations of the facial states and not as a direct translation of motion capture data to the virtual actor. Thus, the level of detail in the facial expressions depicted by the virtual actor is largely dependent on the detail included in the shapes that form the virtual actor and facial states. The detail exhibited on the facial animation does not rely on having motion capture markers on the physical actor capturing the detailed skin and muscular deformation. As such, the facial animation process and apparatus described herein can utilize far fewer motion capture markers than is required of a facial animation process that map motion capture markers directly to deformation in the expression of the virtual actor.

Figure 4:
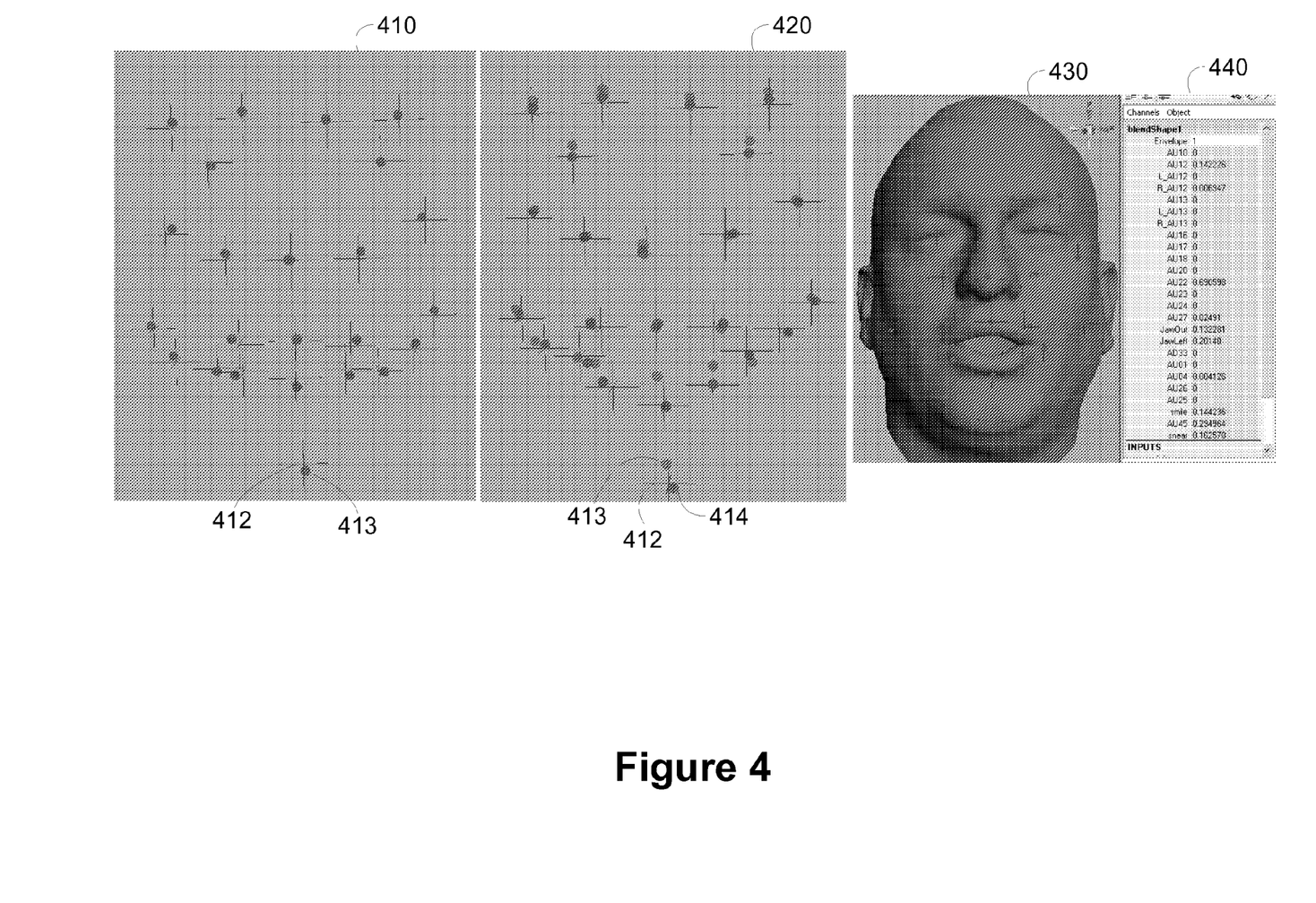
FIG. 4 is a simplified example illustrating facial animation of a virtual actor based on motion capture data.

FIG. 4 is a simplified example illustrating facial animation of a virtual actor based on motion capture data. The first image 410 depicts the positions of motion capture markers 412 stored in a frame of motion capture data. The position of the motion capture markers in the first image 410 can represent the locations of the motion capture markers 412 for the reference image of the physical actor in the predetermined pose, such as the rest pose.

The positions of the motion capture markers 412 are shown overlaid on positions of the virtual markers 413. The positions of the motion capture markers 412 can represent, for example, the registered and aligned positions of the motion capture markers 412. Typically, registration and alignment is conducted in three dimensions, although FIG. 4 illustrates two dimensions for the ease of illustration. Thus, the positions of the motion capture markers 412 may also be interpreted as the positions of the virtual markers 413 of the virtual reference image.

The second image 420 represents an example of motion capture data for a particular frame. The second image 420 illustrates the position of the motion capture markers 412 for the particular frame of motion capture data overlaid on the positions of virtual markers 413 for the reference position. The second image 420 also shown the position of the virtual markers 414 that are determined based on a solver weight solution. That is, the position of the virtual markers 414 represents the position of the markers after blending the facial states according to their weights determined by the solver.

The facial animation apparatus performs the process of determining weights applied to each of the facial states in the animation library such that the weighted facial states, when blended, distort the surface of the virtual actor in a manner that places the virtual markers 414 in substantially the position of the motion capture markers 412 for the frame. The weight solver determines that it has converged on the solution by examining the performance metric, which may be a squared distance.

The third image 430 depicts an example of the facial animation that results from combining, morphing, or otherwise blending the weighted facial states. The third image 430 also includes a display window 440 that provides a listing of the facial states and the corresponding weights determined by, for example, the weight solver for the facial states. The display window 440 displays the modified weights if the facial animation image of the third image 430 represents an edited facial animation.

Figure 5:
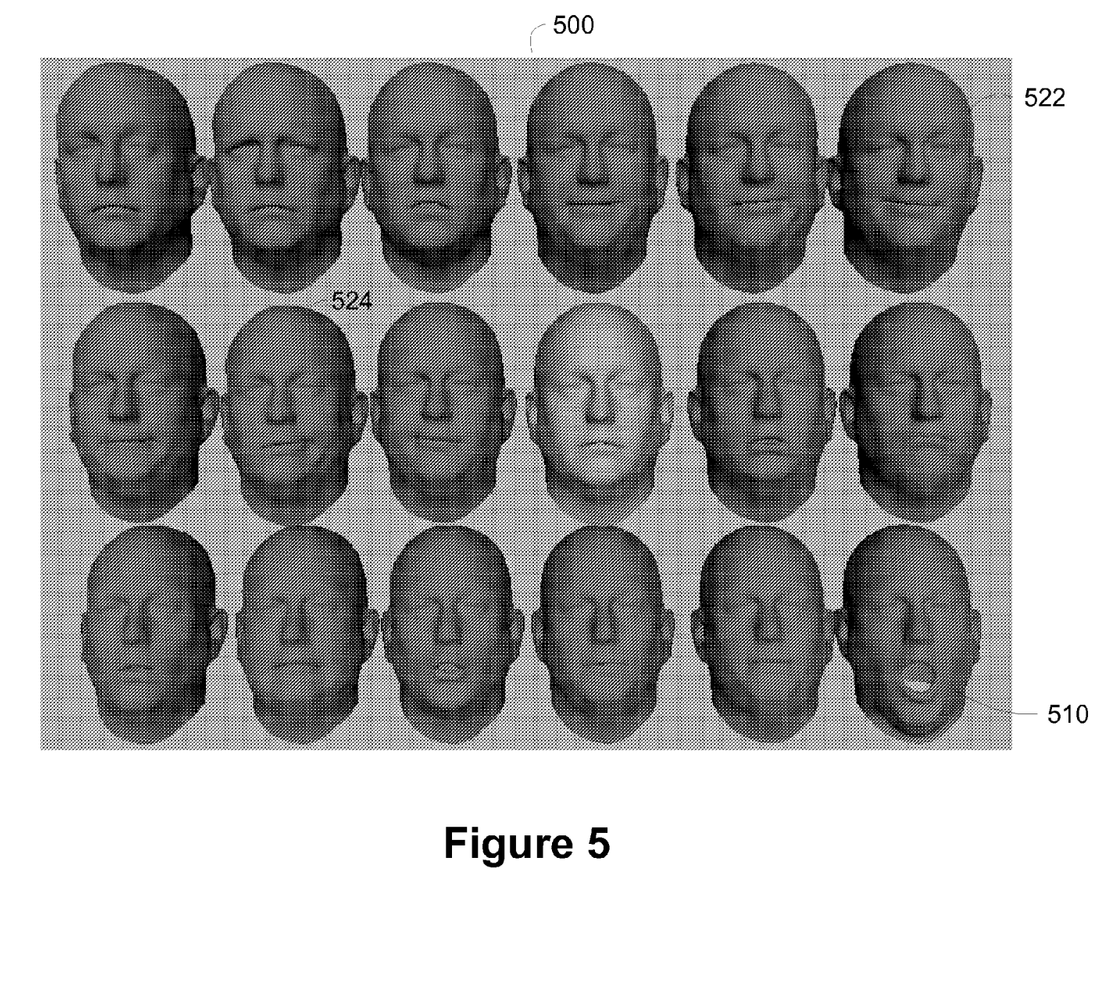
FIG. 5 is an example of various facial states within an animation library.

FIG. 5 is an example of an animation library having various facial states. The various facial states, e.g. 510, can each be generated from a virtual reference image having virtual markers by deforming the mesh or curves of the virtual reference image to sculpt the desired facial state. The virtual markers maintain their positions on the surface of the mesh. The deviation of the positions of the virtual markers in the sculpted facial state from their positions on the virtual reference image model the deviations that occur due to a change in expression by a physical actor.

The facial state, e.g. 510, depicted in FIG. 5 can illustrate the maximum range of the facial state with no other contributing facial state. That is, each of the facial states illustrated in FIG. 5 are the results of having only one weighted facial state, and the weight for the facial state set to its maximum value.

There is virtually no limit to the number of facial states that can be included in the animation library. However, inclusion of numerous facial states may complicate the solution determined by the weight solver without substantially improving the facial animation. Having too few facial states in the animation library may result in missing movements in the facial animation and undesirable facial animation results.

The weight solver can determine the weight of each facial state that contributes to a facial animation. The weight solver may be constrained by the bounded range over which each weight may vary. In another embodiment, the weight solver may be constrained by limitations on combinations of facial states. For example, the weight solver may include one or more constraints that require some facial states to be applied mutually exclusively of other facial states. For example, a facial state that represents "mouth right" may be constrained to be mutually exclusive to a facial state that represents "mouth left." Of course some facial states may not be exclusive to any other facial state while other facial states may be mutually exclusive to more than one distinct facial state.

Figure 6:
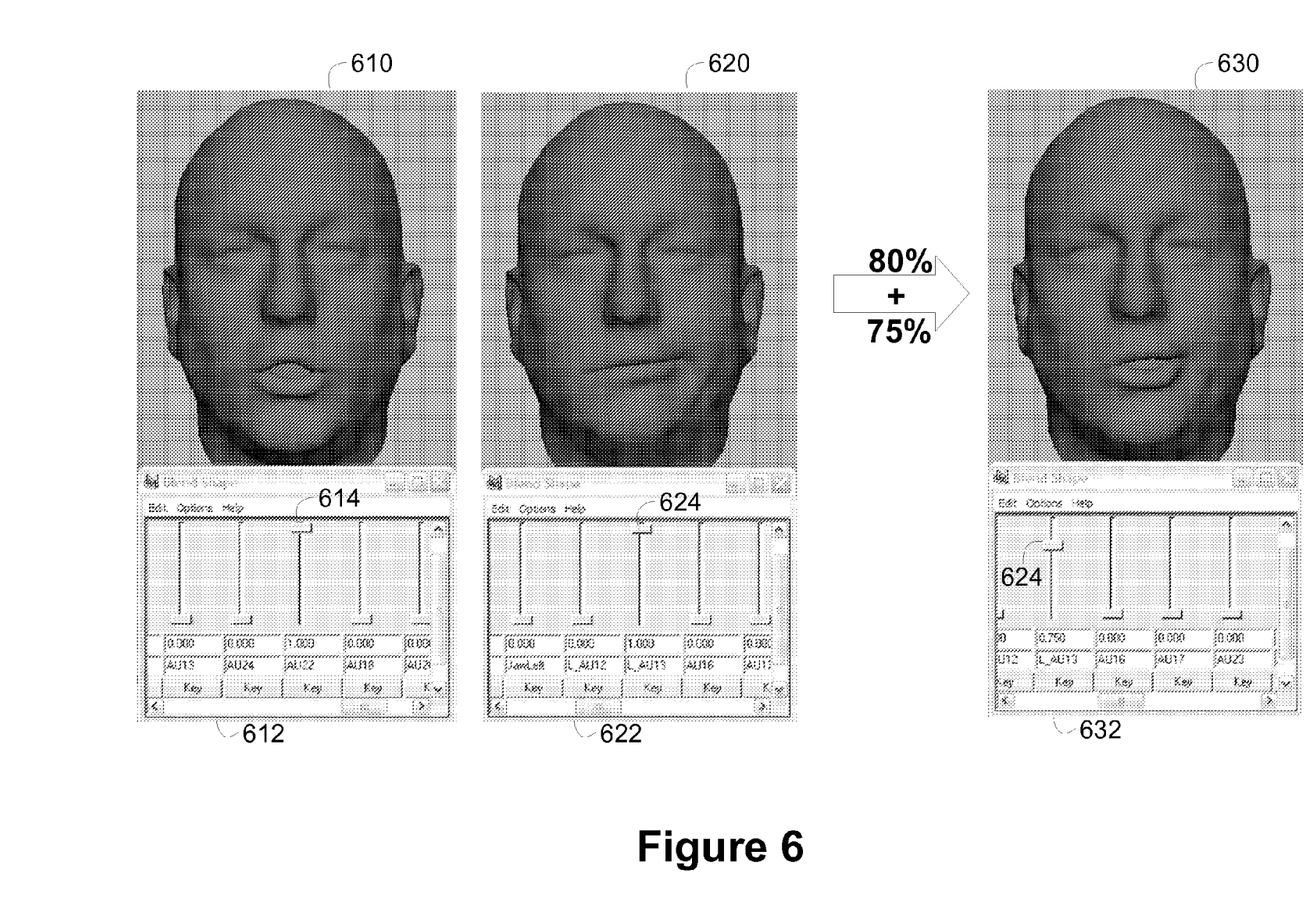
FIG. 6 is a simplified example illustrating a blend of facial states.

FIG. 6 is a simplified example illustrating a blend of facial states and the resultant facial animation. The blend of facial states illustrated in FIG. 6 may be based on weights determined by the weight solver or can be determined manually based on user edits input to the facial animation apparatus via a user input.

A first image depicts facial animation of a first facial state 610. The first facial state 610 is shown at its full range with no other facial states contributing to the image. A first control display 612 illustrates a portion of a graphic user interface that can be used to edit the facial animation. The first control display 612 illustrates a number if slide controls, each of which corresponds to a particular facial state within an animation library. The first control display 612 illustrates a first slide control 614 for the displayed first facial state 610. The first slide control 614 for the displayed first facial state 610 is shown positioned in its maximum or full range.

Similarly, a second image depicts facial animation of a second facial state 620 and a second control display 622. The second facial state 620 is similarly shown at its full range with no other contributing facial states. The second control display 622 illustrates a second slide control 624 positioned at its full or maximum range and all other slide controls positioned at their minimum range.

A third image illustrates a facial animation 630 that is a blend, morph, or combination of the first two images with the first facial state 610 controlled to be weighted to approximately 80% of full range and the second facial state 620 weighted to be at approximately 75% of its full range. The first and second facial states, 610 and 620 respectively, can be, for example, controlled to the weights by repositioning the slide controls, 614 and 624. The third control display 632 illustrates the second slide control 624 repositioned to be at approximately 75% of its full range.

The resulting facial animation, and the various textures and deformations in the facial animation, are based on the curves, mesh, and other structures that underlie each facial state. The combined facial animation 630 does not necessarily reflect a facial mapping of physical motion capture markers to virtual space, but may instead rather reflect the weighted solution in virtual space that best conforms to positions of physical markers in the motion capture data.

Figure 7:
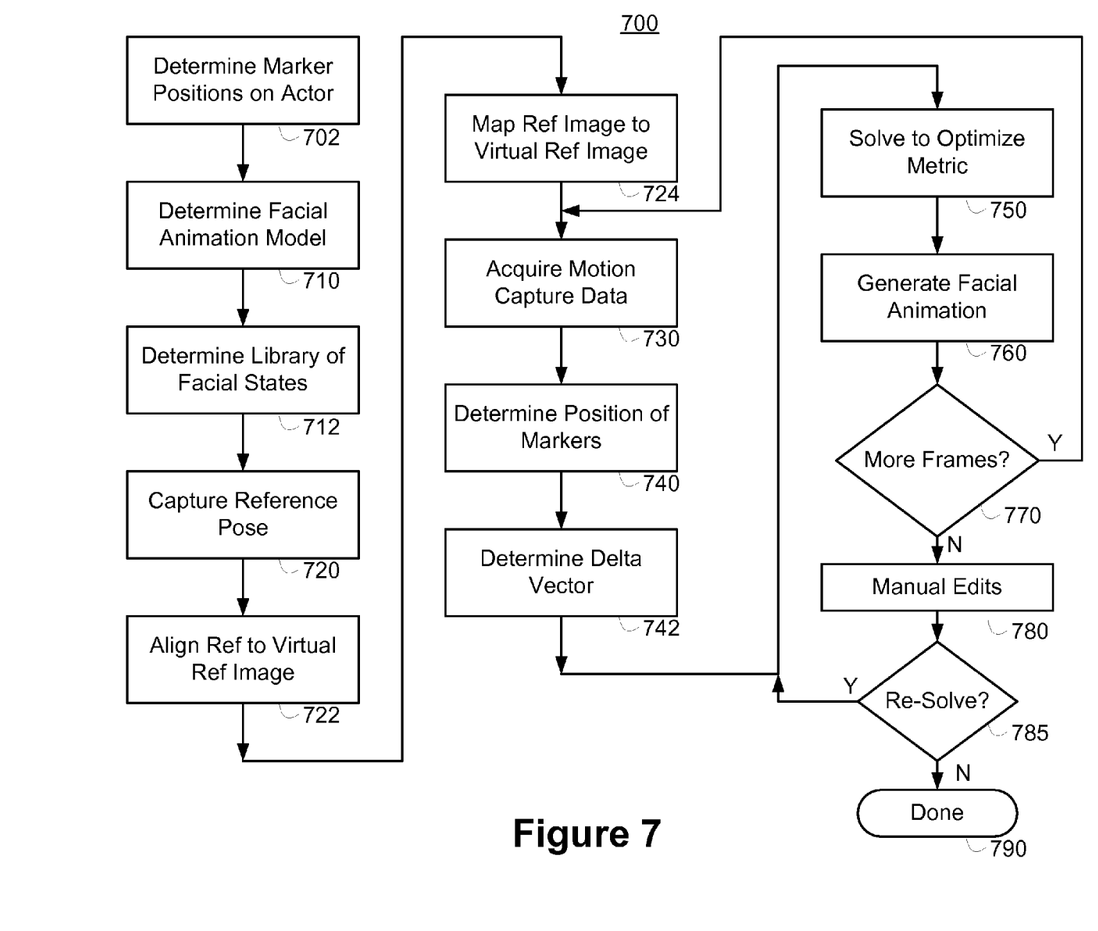
FIG. 7 is a simplified flowchart of a method of facial animation using motion capture data.

FIG. 7 is a simplified flowchart of a method 700 of facial animation using motion capture data. The method 700 can be performed, for example, by the facial animation apparatus of FIG. 1 or FIG. 2 in conjunction with inputs or controls provided by an animator.

The method 700 begins at block 702 where the animator determines the position of the motion capture markers on the physical actor. The number of motion capture markers positioned on the face of the physical actor for the described embodiments may be fewer than the number utilized in other motion capture implementations that directly map the position of motion capture markers to the facial animation. In direct mapping facial animation implementations, the displacement of the motion capture markers may be used to displace the virtual marker on the virtual actor. Thus, the detail in the animated facial expression may directly correspond to the ability of the motion capture markers to capture a change in the physical actor.

However, in the methods and apparatus described herein, the facial animation of the virtual actor is a result of blending multiple facial animation states. The detail in the resultant facial animation is not necessarily a function of the detail captured by the motion capture markers, but instead, is based on the detail that is contained within each facial state contributing to the blended facial animation. As an example, the number of motion capture markers to support the disclosed methods and apparatus can be as few as thirty markers with substantially no loss of detail in features animated in the virtual actor.

The animator can proceed to block 710 and can determine an animation model for the virtual actor. In some embodiments, the virtual actor can be defined to be substantially a likeness of the physical actor. However, in other embodiments, the virtual actor need not bear any resemblance to the physical actor. For example, the virtual actor can be a stylized or fantasy character that need not have any analog in the physical world.

The animator can generate, for example, a model of the virtual actor using any of various animation tools. For example, the animator can define a sculpture of a head based on a set of NURBS curves. The animator can also define the underlying model for animating the various facial states. For example, the movements of a virtual actor that substantially represents a human head may have its movements modeled by a predetermined facial model, such as Facial Action Coding States (FACS).

At step 712, the animator defines the animation library. The animator can determine the facial states that contribute to the animation library as well as the facial state that will represent the reference facial state. Each facial state can represent a different facial expression, and the number and variation of facial states in the animation library contributes to the ability to produce realistic facial animation. The animator can, for example, sculpt each facial state based on, for example, a 3-D scan of the physical actor, a model of a virtual actor in a reference facial state, or some other model or representation of the virtual actor.

The animator proceeds to block 720 and the facial animation apparatus captures a reference image of the physical actor in a predetermined pose. The positions of the motion capture markers in the reference image is mapped to the positions of the virtual markers in the virtual reference image. Typically, the reference image is captured with the physical actor exhibiting the same facial expression as defined by the virtual reference image. For example, the reference image can be captured with the physical actor in a rest pose, displaying substantially no expression. The facial animation apparatus can, for example, receive motion capture data for the reference image from a set of video cameras configure to record the position of the motion capture markers.

After capturing the data for the reference image, the facial animation apparatus proceeds to block 722. At block 722, the facial animation apparatus aligns and registers the reference image to the virtual reference image. The facial animation apparatus can be configured to perform alignment and registration automatically, in conjunction with manual commands from the animator, or some combination of manual and automated processes. In one embodiment, the facial animation apparatus can be configured to display the reference image and the virtual reference image on a display. The facial animation apparatus can accept inputs from an animator that modifies the reference image to permit the animator to perform alignment and registration of the images. The user interface on the facial animation apparatus can be used to control, for example, scale, rotation, translation, tilt, and other aspects of the reference image or virtual reference to facilitate alignment and registration.

Once the reference image and virtual reference image are aligned and registered, whether automatically or manually, the facial animation apparatus proceeds to block 724 to map the positions of the motion capture markers on the aligned and registered reference image to the positions of the virtual markers on the virtual reference image. The facial animation apparatus can, for example, determine the position for each motion capture marker relative to its nearest virtual marker, and compensate future motion capture data with an offset distance determined from the mapping.

The facial animation apparatus proceeds to block 730 and captures or otherwise receives the motion capture data for one or more frames on which to perform facial animation. Typically, the motion capture data is organized into frames of motion capture data which have been processed to align motion capture markers and otherwise remove head movements unrelated to facial animation. The facial animation apparatus can be configured to retrieve a single frame of motion capture data from memory or can be configured to receive motion capture data from a source, such as a set of motion capture cameras, one frame at a time.

The facial animation apparatus proceeds to block 740 once it receives or retrieves a frame of motion capture data. The facial animation apparatus determines the position of the motion capture markers. The facial animation apparatus can use, for example, motion capture data from multiple cameras to determine the position of each motion capture marker in three dimensions. The facial animation apparatus can determine an x, y, and z position, for example, for each motion capture marker according to a rectangular coordinate system defined during the registration and mapping of the reference image.

The facial animation apparatus proceeds to block 742 and determines a distance between each motion capture marker in the motion capture data and a corresponding virtual marker on the virtual reference image. Typically, the facial animation apparatus is able to uniquely identify the pairing of the motion capture marker with an associated virtual marker, especially if there is a one-to-one correspondence of motion capture markers to virtual markers and if the displacement of at least one of the motion capture markers is small relative to the distances between adjacent markers. The facial animation apparatus can be configured to determine the distance after correcting for mapping errors determined during the mapping of the reference image to the virtual reference image.

In some embodiments, the facial animation apparatus can be configured to determine or otherwise indicate direction in addition to distance. As an example, the facial animation apparatus can be configured to determine a vector indicating a delta of each motion capture marker relative to its associated virtual marker.

The facial animation apparatus proceeds to block 750 and determines a solution of weights for the facial states in the facial animation library that combine or blend to substantially match the motion capture data. The facial animation apparatus can be configured to optimize a performance metric associated with the weights. The performance metric can be, for example a minimum distance, a minimum squared distance, or some other performance metric.

The facial animation apparatus can be configured to optimize the performance metric in the presence of one or more solution constraints. A solution constraint can be, for example, a rule that constrains or otherwise bounds the weight solution. For example, the solution may be a bounded least squares solution, where each of the weights is constrained to lie within a predetermined range. The predetermined range may be a range of expression over which each of the facial expressions is normalized. Another constraint may designate a facial state mutually exclusive of one or more other facial states. Under this constraint, a weight solution having a non-zero weight associated with a facial state may not have a non-zero weight associated with a mutually exclusive facial state. An example of mutually exclusive facial states can be, for example, a "mouth left" facial state and a "mouth right" facial state.

After determining a weight solution, the facial animation apparatus proceeds to block 760 and determines a facial animation based at least in part on the weights for the various facial states. The facial animation apparatus can be configured to, for example, execute a blend shape deformer that performs linear vertex morphing of the facial states according to their weights. The facial states are used as targets by the blend shape deformer.

After generating the facial animation, the facial animation apparatus proceeds to decision block 770 to determine if there are additional frames to animate or if all frames of motion capture data have been animated. If more frames of motion capture data exist, the facial animation apparatus returns to block 730 to capture, retrieve, or otherwise receive the next frame of motion capture data. If all motion capture data has been processed to generate corresponding facial animation frames, the facial animation apparatus proceeds to block 780.

At block 780, the facial animation apparatus permits the animator to perform manual edits on any of the previously generated facial animation frames. An animator can, for example, preview the facial animation and determine that one or more frames are to be edited. The facial animation apparatus can receive edits from an animator via a graphical user interface. The graphical user interface may display the facial animation and may display controls associated with one or more of the facial states. The animator may adjust the weight of the facial states by manipulating the control associated with the facial state. For example, a graphical user interface may display a slide control for each of the facial states, and the animator may adjust the weight of a facial state by manipulating its corresponding slide control.

The facial animation apparatus may also permit global changes to one or more of the facial states. The facial animation apparatus may also permit edits to one or more parameters or constraints related to the weight solver. For example, the range of the facial states may initially be normalized to the same range. The animator can adjust a range of one or more of the facial states to extend through a range that is distinct from the normalized range. The updated range may be applied to all of the facial animation frames or only to a selected subset of frames. The ability to modify the range may be helpful where a facial state does not satisfactorily depict a facial expression by the physical actor, or where a particular facial animation is to be exaggerated.

The facial animation apparatus may update the facial animation as the animator adjusts the controls to provide visual feedback to the animator of the change in the facial animation. The user interface may permit the animator to accept the edits and store the edited facial animation frame. Once the animator has manually edited the facial animation frames, the facial animation apparatus can proceed to decision block 785 to determine if the edits require an updated weight solution. For example, when manual edits add or remove facial states available to the weight solver, the weight solution may change. If one or more weight solutions needs to be re-determined or otherwise refreshed, the facial animation apparatus proceeds back to block 750 to update the weight solution.

If, at decision block 785, the facial animation apparatus determines that an update of the solution is not needed, the facial animation apparatus proceeds to block 790 and the facial animation process is complete. Update of the weight solution may not be needed, for example, where the animator merely performs animation edits to a particular frame, for example, by adjusting the weight solution for that frame.

Methods and apparatus are disclosed herein to permit facial animation to be processed by solving the motion capture performance to a set of animation controls. Each animation control can be configured to define a particular facial movement for a facial state. Each animation control encodes the subtle muscle deformations and skin movements associated with the facial movement or state.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of facial animation from motion capture data, the method comprising:

capturing a reference image of a performer in a specific state, the performer having a plurality of motion capture markers positioned on a face of the performer;

registering the captured reference image and a virtual reference image based at least in part upon a registration metric, the virtual reference image having a plurality of virtual markers positioned on a virtual face of a virtual character;

mapping the plurality of motion capture markers of the captured reference image to corresponding virtual markers of the virtual reference image;

generating a mesh of curves for the virtual reference image;

generating a virtual expression library having a plurality of predetermined facial states, each of the plurality of predetermined facial states being generated by deforming the mesh of curves of the virtual reference image while the plurality of virtual markers of the virtual reference image maintain their positions relative to a surface of the mesh as the mesh of curves deforms;

acquiring motion capture data based on the plurality of motion capture markers;

determining an offset of each of the plurality of motion capture markers to a corresponding virtual marker from the plurality of virtual markers of the virtual reference image;

determining at least a set of mutually exclusive facial states in the plurality of the predetermined facial states to be applied mutually exclusive to each other;

determining a solution of weights for each of the plurality of predetermined facial states in the animation library based on the offset and the determined set of mutually exclusive facial states; and combining the plurality of predetermined facial states in the animation library according to the solution of weights to generate a facial animation.

2. The method of claim 1, further comprising aligning a reference image of motion capture data to a virtual reference image.

3. The method of claim 1, further comprising receiving user input modifying a weight of a facial state from the plurality of predetermined facial states in the animation library.

4. The method of claim 1, wherein acquiring motion capture data comprises retrieving a frame of stabilized motion capture data from memory.

5. The method of claim 1, wherein acquiring motion capture data comprises receiving an image frame of motion capture markers from each of a plurality of cameras.

6. The method of claim 1, wherein determining the offset of each of the plurality of motion capture markers comprises determining a delta vector for each of the plurality of motion capture markers.

7. The method of claim 1, wherein determining the offset comprises determining a distance to the corresponding virtual marker from a virtual reference image.

8. The method of claim 1, wherein determining the solution of weights comprises determining the solution of weights that optimizes a predetermined performance metric.

9. The method of claim 8, wherein the predetermined performance metric comprises a least squares distance.

10. The method of claim 1, wherein combining the plurality of predetermined facial states comprises linear vertex morphing of facial states according to the solution of weights.

11. The method of claim 1, wherein combining the plurality of predetermined facial states comprises deforming a mesh of curves for each facial state according to the solution of weights.

12. A facial animation apparatus, the apparatus comprising:
- an animation library including a virtual expression library of a plurality of facial states and a virtual reference image, the virtual reference image registered with a reference image captured from a performer based at least in part upon a registration metric, the captured reference image having motion capture markers mapped to virtual markers of the virtual reference image,
- wherein the virtual expression library having a plurality of facial states, each of the facial states being generated by deforming a mesh of curves of the virtual reference image while the plurality of virtual markers of the virtual reference image maintain their relative positions to a surface of the mesh;
- a weight solver configured to access motion capture data, determine at least a set of mutually exclusive facial states from the plurality of facial states to be applied mutually exclusive to each other, and determine a solution of weights for each of the facial states in the animation library to optimize a performance metric based at least in part upon the determined set of mutually exclusive facial states; and
- a shape deformer configured to combine the plurality of facial states according to the solution of weights to generate a facial animation for the motion capture data.

13. The apparatus of claim 12, further comprising:
- a user interface configured to accept adjustments to one or more weights from the solution of weights for the facial animation; and
- an editor configured to modify one or more parameters or constraints on the weight solver.

14. The apparatus of claim 12, further comprising:
- at least one camera configured to record a position of motion capture markers from the performer; and
- a stabilization module coupled to the at least one camera and configured to generate motion capture data by removing head movements of the performer from the position of motion capture markers.

15. The apparatus of claim 12, further comprising a reference capture module configured to map a position of each of the motion capture markers of the performer to a corresponding position of a virtual marker of the virtual reference image.

16. The apparatus of claim 12, wherein each of the plurality of facial states comprises a deformation of the virtual reference image according to a facial animation model.

17. The apparatus of claim 12, wherein each of the plurality of facial states is normalized to a predetermined bounded range.

18. The apparatus of claim 12, wherein the virtual reference image comprises a three dimensional scan of a physical actor.

19. The apparatus of claim 12, wherein the weight solver is configured to optimize the performance metric in the presence of at least one constraint.

20. The apparatus of claim 19, wherein the at least one constraint specifies a first facial state to be mutually exclusive of a second facial state.

21. The apparatus of claim 19, wherein the at least one constraint specifies a bounded range over which each weight in the weight solution may vary.

22. The apparatus of claim 12, wherein the weight solver is configured to determine the weight solution that minimizes a least squares distance from motion capture markers in the motion capture data to virtual markers.

23. The apparatus of claim 12, wherein the weight solver is configured to perform a bounded least squares solution based on a position of motion capture markers in the motion capture data and a position of virtual marker.

24. The apparatus of claim 12, wherein the shape deformer is configured to perform a linear vertex morphing of facial states according to the solution of weight.

* * * * *